United States Patent

[11] 3,588,668

| | | |
|---|---|---|
| [72] | Inventor | Francois Cova<br>42, Avenue Michel Leconictre, 44 Nantes, France |
| [21] | Appl. No. | 753,155 |
| [22] | Filed | Aug. 16, 1968 |
| [45] | Patented | June 28, 1971 |
| [32] | Priority | Aug. 23, 1967 |
| [33] | | France |
| [31] | | 118,709 |

[54] CONTROL DEVICE FOR CYCLOCONVERTERS
3 Claims, 8 Drawing Figs.

[52] U.S. Cl. .................................................. 321/5, 321/18, 321/45, 321/58
[51] Int. Cl. .................................................. H02m 7/12
[50] Field of Search.......................................... 321/5, 7, 18, 27, 45, 58

[56] References Cited
UNITED STATES PATENTS

| | | | |
|---|---|---|---|
| 3,293,448 | 12/1966 | Amato................................ | 307/261 |
| 3,320,514 | 5/1967 | Lawrence........................... | 321/18X |
| 3,315,143 | 4/1967 | Lawrence et al. .................. | 321/58X |
| 3,320,515 | 5/1967 | Amato et al. ....................... | 321/18X |
| 3,337,788 | 8/1967 | Pelly................................... | 321/7 |
| 3,407,348 | 10/1968 | Lawrence et al. ................... | 321/27 |
| 3,431,483 | 3/1969 | Lafuze................................. | 321/7 |

*Primary Examiner*—William M. Shoop, Jr.
*Attorney*—Max Wall

ABSTRACT: A blocking device prevents the simultaneous operation of two rectifying groups of the cycloconverter. A pilot device furnishes from a polyphase supply network a pilot network which is perfectly in phase with the supply network. A logic contact device delivers to the control electrodes of the thyristors of each rectifying group which must be conductive pulses throughout the conduction time this or each of the rectifying groups.

CONTROL DEVICE FOR CYCLOCONVERTERS

The present invention relates to a control device for cycloconverters.

The object of the invention is to provide a control device for a cycloconverter which comprises thyristor rectifying groups fed from a polyphase network and which discharges into at least one load impedance, said device comprising a blocking device for eliminating the possibility of simultaneous operation of two rectifying groups, a pilot device adapted to provide from a polyphase supply network a piloting network perfectly in phase with said polyphase network and containing no parasite pulses due to the switching of the thyristors, and a logic control device adapted to deliver to the control electrodes of the thyristors of each rectifying group which must be conductive pulses during the whole of the conduction time of this or these groups and to maintain blocked the control electrodes of the thyristors pertaining to the systems which must not be conductive.

Further features and advantages of the invention will be apparent from the ensuing description with reference to the accompanying drawings.

Figure 1:
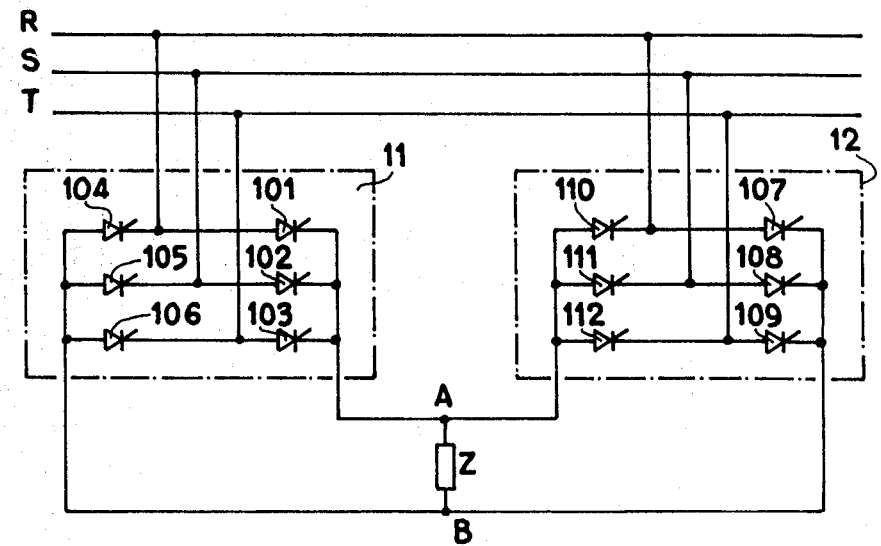
FIG. 1 shows diagrammatically a conventional single phase cycloconverter.

A single phase cycloconverter usually comprises two thyristor rectifying groups fed from a sinusoidal alternating three phase network, as shown in FIG. 1. A group 11 having six thyristors 101—106, termed the positive group, is connected in such manner as to allow the circulation of the current from A to B in a load impedance Z and a group 12 having six thyristors 107—112, termed a negative group, is connected in such manner as to allow the circulation of the current from B to A in the impedance Z. In a general way it is possible to construct a polyphase cycloconverter having n phases by associating n single phase cycloconverters.

Figure 2:
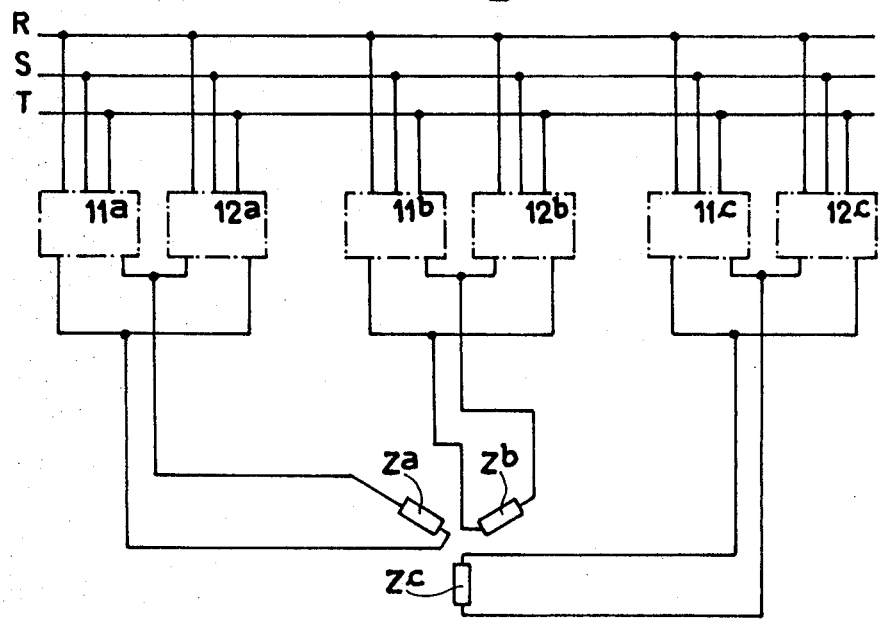
FIG. 2 shows diagrammatically a conventional three phase cycloconverter.

In particular a three phase cycloconverter is constructed by associating three single phase cycloconverters as shown diagrammatically in FIG. 2.

These cycloconverters comprise respectively positive thyristor groups 11a, 11b, 11c and negative thyristor groups 12a, 12b, 12c and discharge into three impedances Za, Zb, Zc.

Provided that the thyristors of the positive and negative groups are rendered conductive at appropriate moments and in accordance with an appropriate sequence, a cycloconverter can deliver an almost sinusoidal alternating signal having a frequency between zero and one-half of that of the three phase supply network.

A first difficulty met with in these known cycloconverters is in the connection of the two rectifying groups to the same load. Indeed, in a simultaneous operation of the groups, instantaneous differences in potential exist at their outputs which result in the short-circuiting of the supply network. For the purpose of avoiding these phenomena various solutions have been proposed but the sole theoretically valid solution is to prevent the simultaneous operation of the groups which is in no case essential.

A second difficulty resides in the very operation of the cycloconverter. Indeed, at each switching of the thyristors, the two phases of the supply network are short-circuited through the thyristor which was previously conductive and that which is has just been rendered conductive. This short circuit continues so long as the first thyristor is not blocked. The duration of this short circuit varies with the type of the thyristor employed and the nature of the load between 20 and 200 microseconds.

The short-circuits due to the switchings appear in the supply network as "gaps" or absences of voltage which render the direct utilization of the network difficult for synchronizing or piloting the control device of the thyristors.

A third difficulty concerns the operational safety of the thyristors. It is well known that in supplying the control electrode of a thyristor with a pulse of a duration of a few microseconds and provided that the anode-cathode voltage is correct, the thyristor changes from the nonconductive state to the conductive state. Usually the time during which the thyristor remains conductive is considerably longer than the duration of the triggering pulse and has a value between hundreds of microseconds and hundreds of milliseconds.

If, owing to an outside cause, the anode-cathode is voltage temporarily inverted, the thyristor can return to a nonconductive state and it is then essential to once again apply a pulse to the control electrode so as to resume the conductive state. It is clear that the ideal control of the thyristor is achieved by maintaining the pulse on the control electrode throughout the desired conduction period. In practice, a device achieving such a control is costly and space-consuming and devices providing one or two control pulses are mostly employed.

In order to remedy the aforementioned drawbacks, integrated circuits have been employed which also considerably reduce the weight and volume of the equipment.

In order to facilitate an understanding of the invention a particular application to a single phase cycloconvertor loaded by a pure inductance will be described in detail. It must be understood that minor modifications, such as a modification of the load impedance or of the arrangement of the gates of the logic control circuit or of the utilization of different elements having a function identical to that explained in the description, are considered only variants of the invention.

Figure 3:
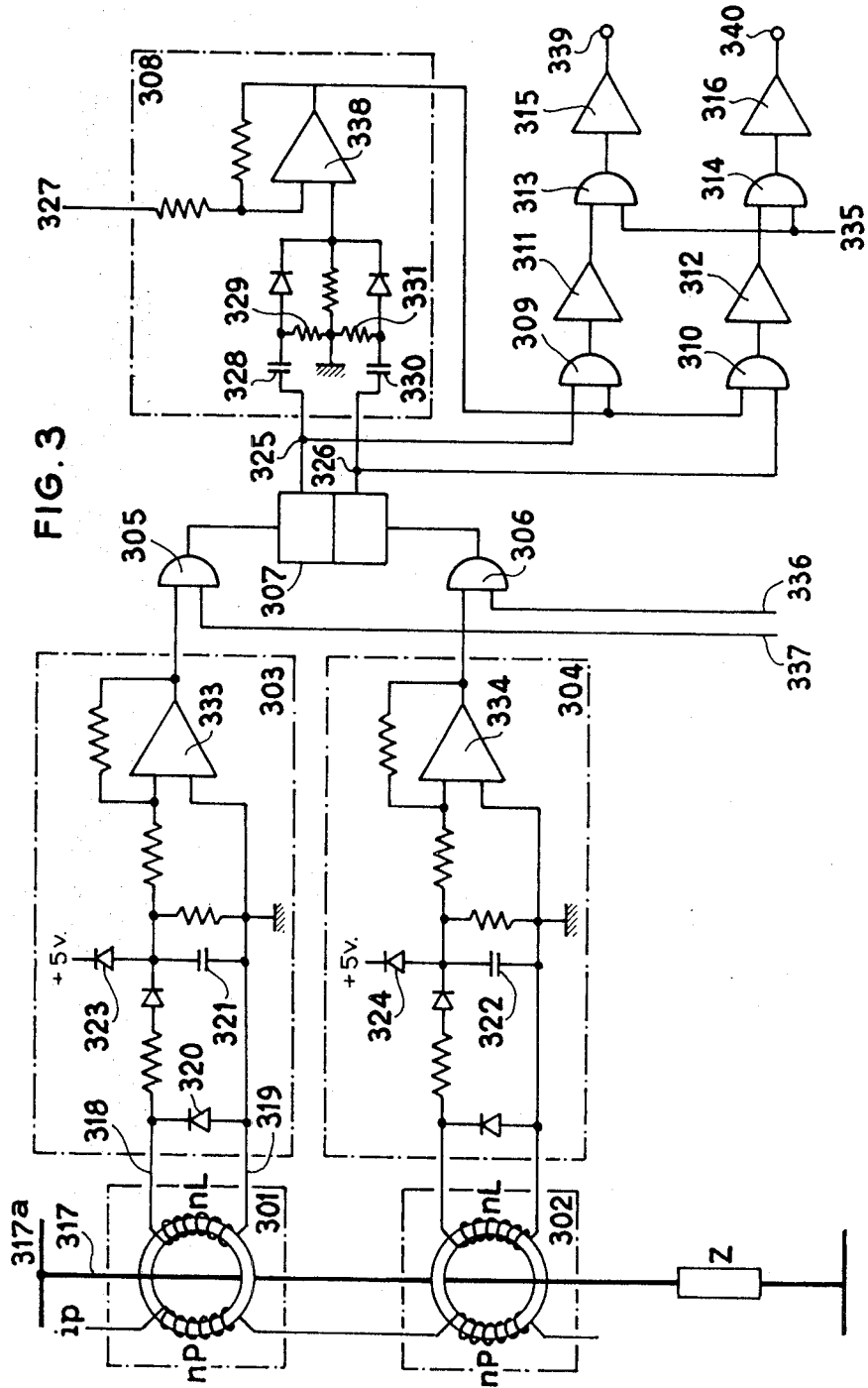
FIG. 3 shows an embodiment of a blocking device for the control device according to the invention.

FIG. 3 shows one embodiment of the blocking device which comprises two magnetic detectors 301 and 302 for detecting the direction and value of the current through a load Z, two shaping stages 303 and 304, two AND gates 305 and 306, a flip-flop circuit 307, a controllable delay circuit 308, two OR gates 309 and 310, two inverting amplifiers 311 and 312, two AND gates 313 and 314 and two inverting amplifiers 315 and 316. Each magnetic detector comprises a ferrite ring on which is wound a polarization winding nP and a reading winding nL. The wound ring is traversed by a connecting wire 317 between the common point 317a of the outputs of the two rectifying groups (not shown) and the load Z.

Figure 4:
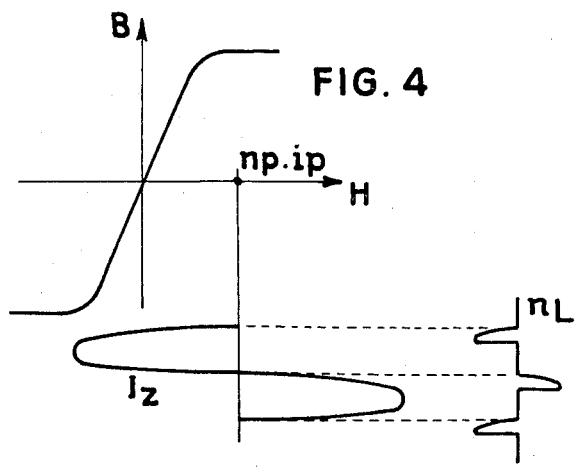
FIG. 4 represents the $B = f(H)$ characteristic of the magnetic material employed for the rings of the magnetic detectors shown in FIG. 3, the current in the load impedance and the signal received at the terminals of the reading coil of a magnetic detector.

FIG. 4 shows the $B = f(H)$ characteristic of the magnetic material, the Iz current signal in the wire 317 and the reading signal received between the terminals 318 and 319 of the detector 301. The polarization winding nP carries a polarization current ip which saturates the ring in one direction. When the positive alternation of the current flows through the wire 317, two pulses of opposite signs appear in the reading winding, one pertaining to the beginning and the other to the end of the alternation. When the negative alternation of the current flows through the wire 317, the magnetic material is supersaturated and no signal appears between the terminal 318 and 319 of the reading winding.

Of the two pulses, only that concerning the end of the positive alternation is employed, the other is clipped by a diode 320. The amplitude of the effective pulse depends on that of the current in the wire 317. By selecting a magnetic material having a weak coercive field, the detector is responsive to a current less than one ampere. In order to detect the end of the negative alternation in the wire 317, a second magnetic detector 302, identical to the foregoing one, is employed.

The wire 317 traverses the second magnetic detector in the opposite direction of the first detector. Capacitors 321 and 322 integrate the reading pulses so as to eliminate the fine parasite signals which could be read. Diodes 323 and 324 limit the maximum amplitude of the reading pulses applied to the comparators 333 and 334 of the type DTμL 710 sold by the company FAIRCHILD. At the output terminals of the comparators 333 and 334, the end pulses of the positive and negative alternations are at the logic levels and are applied to the AND gates 305 and 306.

Validation signals can be applied to the latter, for certain applications, through two conductors 336, 337, for example, when the cycloconvertor operates under a pure resistive load.

The outputs of the gates 305 and 306 are connected to the control inputs of the flip-flop circuit 307 of the type DTμL 945 of the aforementioned constructor which changes its state when a pulse corresponding to an end of an alternation arrives. Thus the output 325 of the flip-flop circuit is at the high logic level during the interval of time between the positive alternation end pulse and the negative alternation end pulse, and the output 326 of the flip-flop circuit is at the high logic level during the interval of time between the negative alternation end pulse and the positive alternation end pulse. The outputs 325 and 326 of the flip-flop circuit are interconnected at the inputs of the OR gates 309 and 310 and to those of the delay element 308. The function of the latter is to make a pulse of well-defined duration, depending on the amplitude of the voltage applied to a wire 327, to correspond to each change in the state of the flip-flop circuit. Various devices can perform this function. That chosen for example comprises a comparator 338 of the type DTμL 710 one of the inputs of which is connected to the wire 327 connected to a control voltage source, the other input being fed with signals derived through RC circuits 328, 329 and 330, 331 from the state-changing edges of the flip-flop circuit 307.

The output of the comparator delivers a negative pulse, for each change in the state of the flip-flop circuit 307, of a duration equal to the time during which the level of the derived signals is higher than the level of the control voltage applied through the wire 327.

These negative pulses are termed "dead zone" pulses DZ (see FIG. 5 Graph 327) since they correspond to the period during which neither of the two rectifying groups is conductive. This interruption of the operation is rendered necessary by the fact that the magnetic detectors employed do not exactly detect the passage through zero of the current but the passage at a few hundredths of milliamperes. Now, it is known that a thyristor is maintained conductive by a current of a few tens of milliamperes. Consequently, it is not possible to render conductive the other rectifying group as soon as the reading signal appears without danger of short-circuiting the supply network. The dead-zone pulses and the output signals of the flip-flop circuit 307 are applied to the OR gates 309 and 310. The correct validation signal of each of the rectifying groups is obtained at the output of these gates. For the positive rectifying group, this signal starts at the end of the dead-zone pulse derived from the end of the negative alternation and stops at the start of the dead-zone pulse derived from the end of the positive alternation.

As concerns the negative rectifying group, this signal starts at the end of the dead-zone pulse derived from the end of the positive alternation and stops at the start of the dead-zone pulse derived from the end of the negative alternation.

Figure 5:
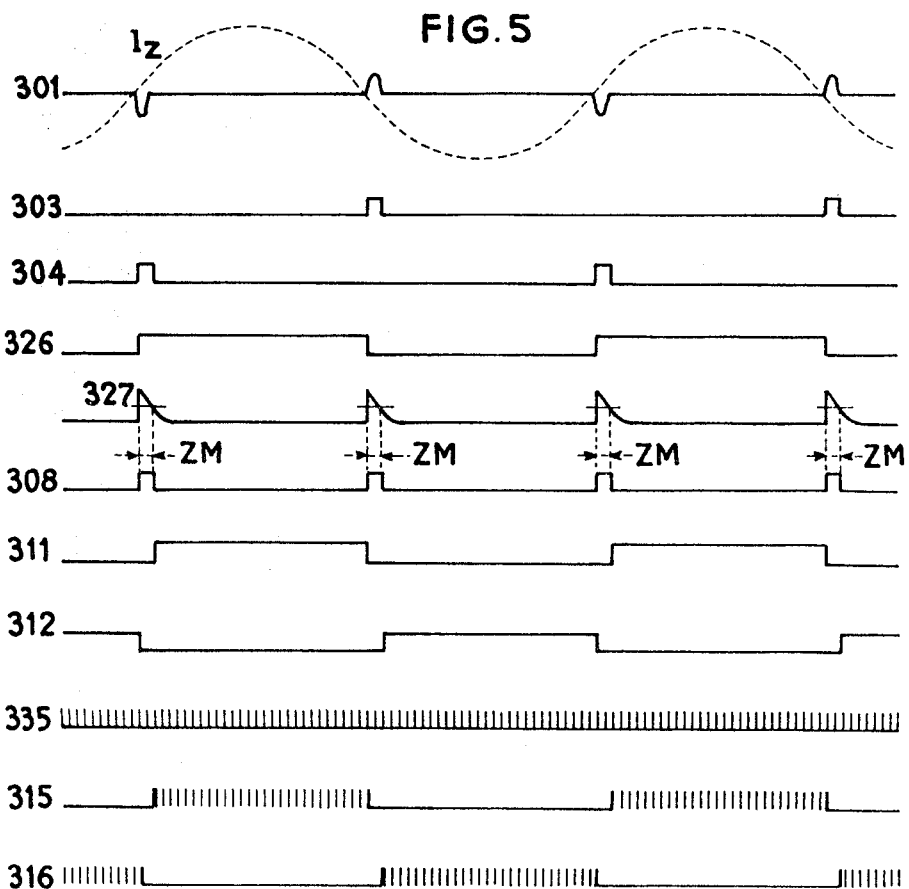
FIG. 5 shows the signals characterizing the operation of blocking device shown in FIG. 3.

After inversion in the inverting amplifiers 311 and 312, the validation signals of the rectifying groups are mixed with a continuous train of fine pulses delivered by a multivibrator (not shown) at an input of the AND gates 313 and 314 through a connection 335. A multivibrator or any other fine pulse generator can be employed without departing from the scope of the invention. Appearing at the outputs of the AND gates 313 and 314 are two trains of interrupted pulses, one representing the triggering pulses required for the positive group and the other the triggering pulses for the negative group. These two pulse trains are thereafter amplified in the amplifiers 315 and 316 and appear at the output terminals 339, 340. FIG. 5 recapitulates the characteristic signals of the blocking device described in detail hereinbefore.

Figure 6:
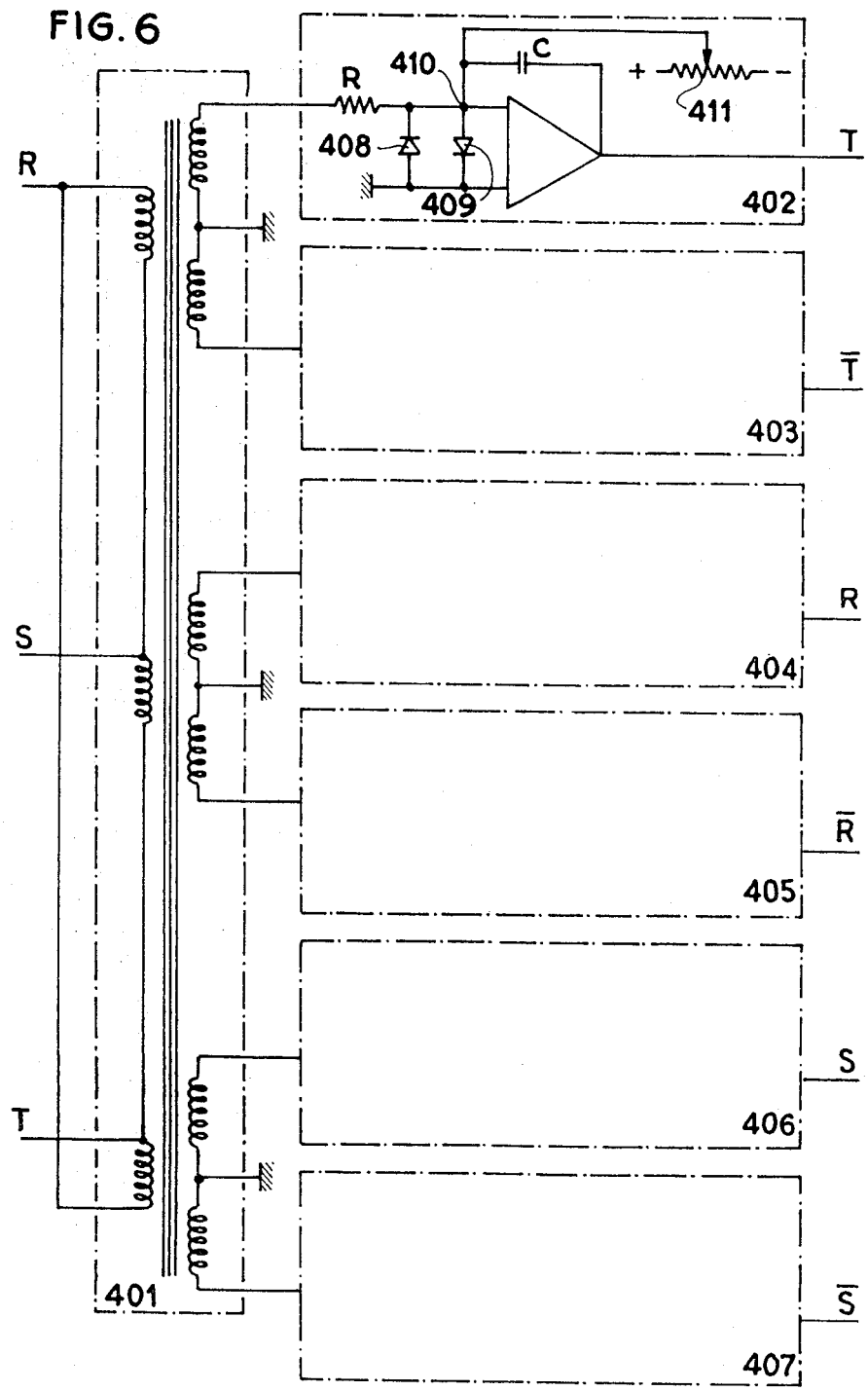
FIG. 6 shows an embodiment of the pilot device for the control device according to the invention.

One embodiment of the pilot device is shown in FIG. 6. It comprises a trihexaphase transformer 401 and six integration amplifiers 402 to 407. The phases of the supply network are united at the three primary windings of the transformer which is connected in triangle. The three secondary windings have a midpoint. Relative to the latter, at one end of a secondary winding, the signal is phase shifted 30° from one of the phases of the supply network. Each secondary end feeds an integration amplifier whose integration constant, given by the product of the magnitudes of a resistor R and capacitor C, is so chosen that at the lowest frequency of the supply network the attenuation ratio between the output signal and the input signal of the integration amplifier exceeds 40 db. Corresponding to such an attenuation is a phase lag of almost 90° and a total elimination of the high frequencies contained in the input signal, which explains the complete disappearance of the aforementioned voltage "gaps."

The sum of or the difference between the phase shifts produced, on one hand, by the transformer and, on the other hand, by the integration amplifier results at the output of the latter in a hexaphase network which is in phase with the three phase supply network to within a few tenths of a degree. Only the amplifier 402 of the six integration amplifiers 402 to 407 is detailed, the others being absolutely identical. The end of each secondary winding opposed to the midpoint is connected to the input of a corresponding amplifier of the type 709 sold by the company FAIRCHILD which is connected as an integration amplifier with the resistor R in series and the capacitor C in parallel.

Diodes 408 and 409, connected upside-down to each other, protect the amplifier from overvoltages. At the input 410 of the amplifier, a DC component, adjustable by a potentiometer 411, is added to the signal furnished by the transformer so as to compensate the DC shift of the amplifier and thus render the output voltage of the amplifier perfectly symmetrical. The five other ends of the secondary windings of the transformer are each connected to an integration amplifier which is identical to the foregoing one and all the outputs carry the reference letters R, S, T, $\bar{R}$, $\bar{S}$, and $\bar{T}$. The signals at these points are perfectly sinusoidal and in phase with or in opposite phase to the supply network.

Figure 7:
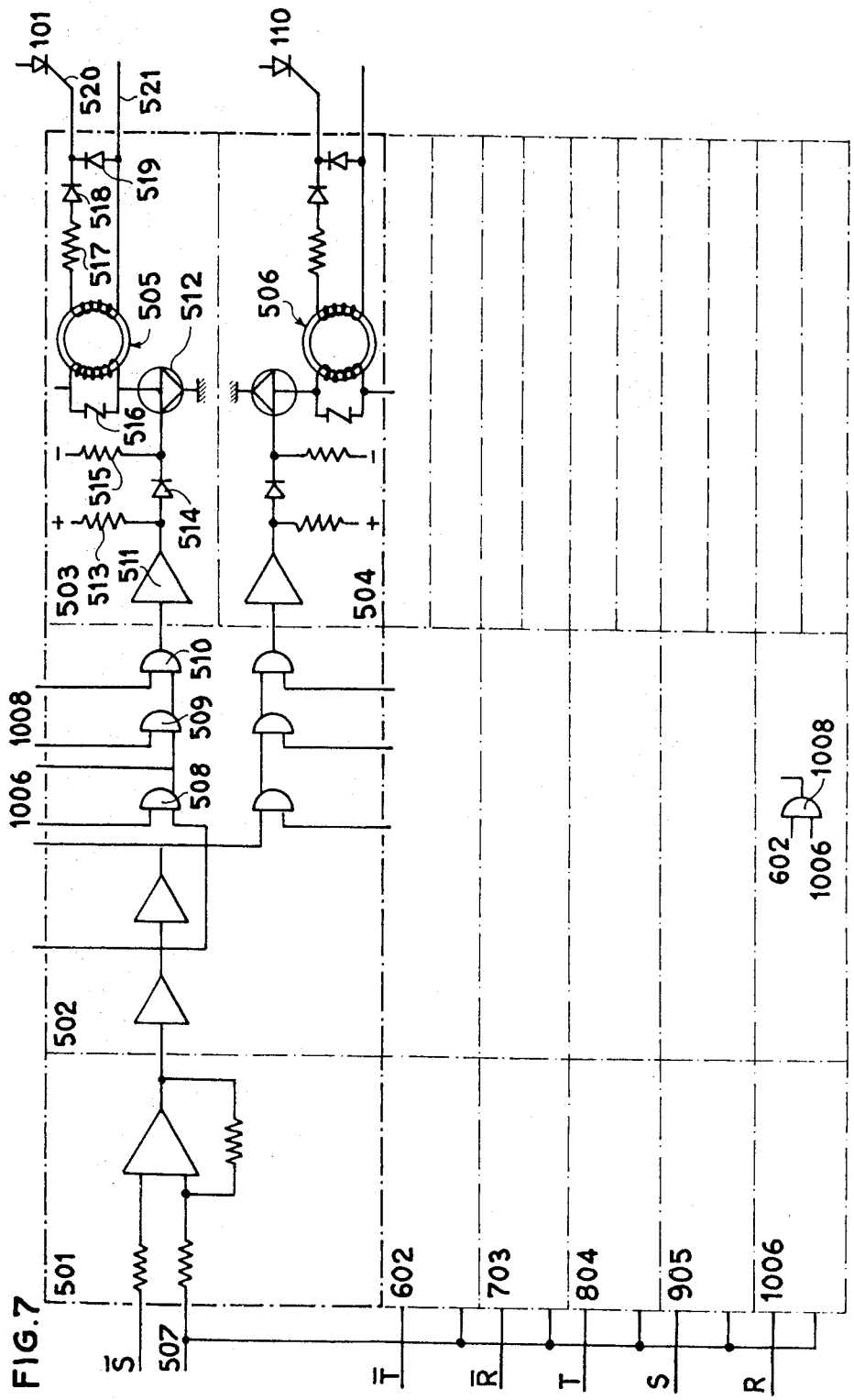
FIG. 7 shows diagrammatically one embodiment of the logic control device for the device according to the invention.

FIG. 7 shows an embodiment of the logic control device which comprises electronic comparators 501, 602, 703, 804, 905 and 1006, gate systems such as 502, groups of two pulse amplifiers, such as 503 and 504, and groups of two isolating transformers, such as 505 and 506. A single phase cycloconverter comprises six logic control devices identical to the foregoing one and each feed two thyristors, namely one of each group. All the electronic comparators have a common input connected to the reference signal. The other input of each of them is respectively connected to a phase of the hexaphase network delivered by the pilot device. For example, in respect of the thyristors 101 and 110 shown in FIG. 1 connected to the phase R of the supply network, the pilot signal applied to the corresponding comparators is $\bar{S}$. The comparator 501 of the FAIRCHILD type 710 effects the comparison between the pilot and reference signals. When the amplitude of the pilot signal exceeds that of the reference signal, the output of the comparator is at the high logic level and, inversely, when the amplitude of the pilot signal is less than that of the reference signal, the output of the comparator is at the low logic level.

Figure 8:
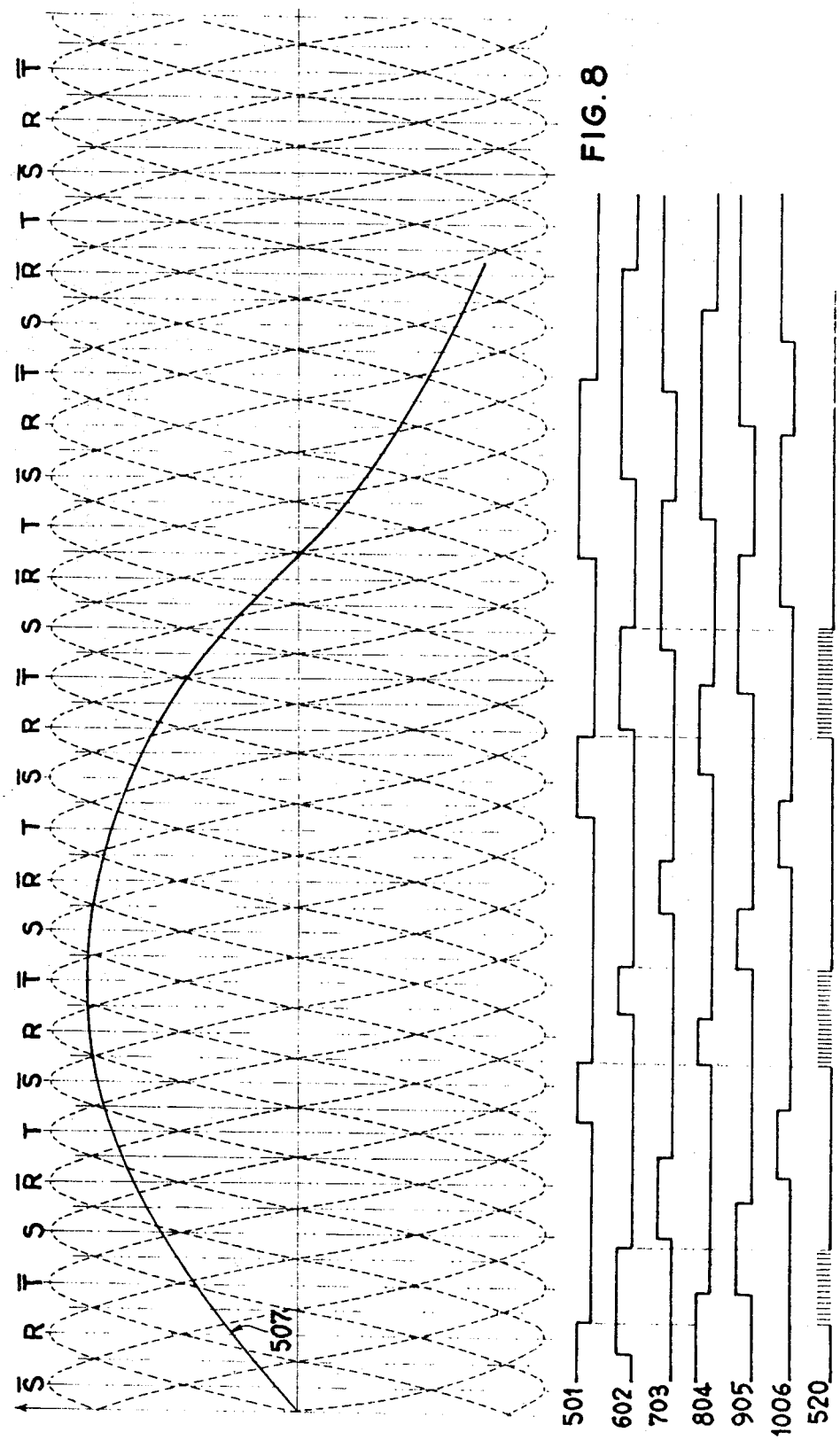
FIG. 8 shows the signals delivered by the six comparators of the device shown in FIG. 7 when a sinusoidal reference signal of frequency $f/6$ is applied to the common input of this device.

FIG. 8 shows the signals delivered by the six comparators when a sinusoidal reference signal of frequency $f/6$ is applied to the common input 507, $f$ being the frequency of the hexaphase pilot network identical to that of the supply network, as mentioned hereinbefore.

The sequences of turning on the thyristors shown in FIG. 1 are for the positive group: 101, 106, 102, 104, 103, 105 and for the negative group: 107, 112, 108, 110, 109 and 111. Each number characterizes the position of the thyristor in the rectifying group to which it pertains. It will be immediately clear that the signals delivered by the comparators cannot be employed directly for effecting a continuous triggering of the thyristors during the whole of the conduction time. For example, the thyristor 101 must become conductive with the trailing edge of the signal delivered by the comparator 501 and it becomes nonconductive, by a natural switching, when the thyristor 102 in turn becomes conductive. Thus the duration of the conduction of the thyristor 101 begins at the trailing edge of the signal delivered by the comparator 501 and stops at the trailing edge of the signal delivered by the comparator 602. It is solely during this conduction period that the triggering pulses must be applied to the control electrode of the thyristor 101. This can be achieved with a logic gate device. For example, a device having four gates is satisfactory and shown in FIG. 7. The first gate 508 is an AND gate between the signals of the comparator 1006 and the inverse signals of the comparator 501 and it delivers a signal extending from the trailing edge of 501 to the trailing edge of 1006. The second gate 1008 is an AND gate between the signals of the comparator 602 and the inverse signals of the comparator 1006 and it delivers a signal extending, from the trailing edge of the comparator 1006 to the trailing edge of the comparator 602. The third gate 509 is an OR gate between the signals of the two preceding gates and it delivers a signal extending from the trailing edge of the comparator 501 to the trailing edge of the comparator 602. The fourth gate 510 is an AND gate between the signal delivered by the preceding OR gate and that delivered by the group-blocking device shown in FIG. 3, the latter signal being, as shown hereinbefore, a train of pulses maintained throughout the validation time of the group to which the considered thyristor pertains.

The gate 510 delivers triggering pulses solely during the time during which the thyristor must be conductive. The output of this gate feeds the input of the pulse amplifier 503 comprising an inverting stage having an integrated circuit 511 and a power transistor arranged as a common emitter 512. A resistor 513 is the load resistor of the integrated circuit 511. A diode 514 produces an 0.7 v. shift of the voltage applied to the transistor 512 and thus facilitates the blocking of the latter.

A resistor 515, brought to the negative potential of the supply, improves the blocking of the transistor 512. The collector of the power transistor feeds the primary winding of the isolating transformer 505. A Zener diode 516, connected to the terminals of the primary winding of the transformer, limits the overvoltages which arise when blocking the transistor 512. The isolating transformer is a miniature transformer having a ferrite ring whose secondary winding is particularly well insulated, the insulation being capable of resisting 1,500 v.

A resistor 517 limits the maximum current supplied by the secondary winding, a diode 518 avoids inverse currents and a diode 519 limits the inverse voltages supplied to the thyristor between its control electrode through a wire 520 and its cathode through a wire 521. A second series of gates identical to the foregoing series, feeds, through the pulse amplifier 504 and the isolating transformer 506, the thyristor 110 pertaining to the negative group. Only the signals of the gate inputs are different and the same is true for the five other similar devices 602, 703, 804, 905 and 1006. The connections for the operation of the whole system are easily deduced from FIG. 8 and from the foregoing embodiment applied to the thyristor 101. Having now described my invention what I claim as new and desire to secure by Letters Patent is:

I claim:

1. A control device for a cycloconverter which includes thyristor rectifying groups fed from a polyphase network and which discharges into at least one load impedance, said device including a blocking device for eliminating the possibility of simultaneous operation of two rectifying groups, a pilot device adapted to provide from a polyphase supply network and containing no parasite pulses due to the switching of the thyristors, and a logic control device adapted to deliver to the control electrodes of the thyristors of each rectifying group which must be conductive, pulses during the whole of the conduction time of said each rectifying groups and to maintain blocked the control electrodes of the thyristors pertaining to the systems which must not be conductive and wherein said blocking device comprises to magnetic detectors for detecting the direction and magnitude of the current in the load, each detector being polarized by a particular winding; two shaping stages each delivering a pulse corresponding, in respect of one, to the end of the positive alternation and, in respect of the other, to the end of the negative alternation of the current in the load; a flip-flop circuit whose changes of state are controlled by the alternation end pulses in such manner that a positive alternation always corresponds to one of the states and a negative alternation of the current in the load corresponds to the other state; a delay element which delivers a dead-zone pulse upon each change of state of the flip-flop circuit, and a logic circuit for the summation of the signals delivered by the flip-flop circuit, that delivered by the delay element and a continuous train of pulses furnished by a source of pulses, said logic circuit being designed to alternatively switch the train of pulses to the positive rectifying group as soon as the end of the "dead zone" pulse, corresponding to the end of the negative alternation of the current in the load, has been reached, and to the negative rectifying group as soon as the end of the "dead zone" pulse, corresponding to the end of the positive alternation of the current in the load, has been reached, neither of the two groups being fed with pulses while a "dead zone" pulse exists.

2. A control device for a cycloconverter which includes thyristor rectifying groups fed from a polyphase network and which discharges into at least one load impedance, said device including a blocking device for eliminating the possibility of simultaneous operation of two rectifying groups, a pilot device adapted to provide from a polyphase supply network a pilot network perfectly in phase with said polyphase network and containing no parasite pulses due to the switching of the thyristors, and a logic control device adapted to deliver to the control electrodes of the thyristors of each rectifying group which must be conductive, pulses during the whole of the conduction time of said each rectifying groups and to maintain blocked the control electrodes of the thyristors pertaining to the systems which must not be conductive, and wherein said polyphase network is a three phase network and the pilot device furnishes from said polyphase network a hexaphase pilot network which is perfectly in phase therewith and contains no parasite pulses due to the switchings of the thyristors and comprises a conventional trihexaphase isolating transformer designed in such manner that it affords a phase lag of 30°, and six integration amplifiers arranged to produce a phase lag of 90° and fed by the six secondary windings of the transformer.

3. A control device for a cycloconverter which includes thyristor rectifying groups fed from a polyphase network and which discharges into at least one load impedance, said device including a blocking device for eliminating the possibility of simultaneous operation of two rectifying groups, a pilot device adapted to provide from a polyphase supply network a pilot network perfectly in phase with said polyphase network and containing no parasite pulses due to the switching of the thyristors, and a logic control device adapted to deliver to the control electrodes of the thyristors of each rectifying group which must be conductive, pulses during the whole of the conduction time of said each rectifying groups and to maintain blocked the control electrodes of the thyristors pertaining to the systems which must not be conductive, and wherein said logic control device comprises six identical subassemblies, each subassembly comprising an electronic comparator for effecting a comparison between one phase of the pilot device and the reference signal common to all of said subassemblies, two logic gate systems fed by the signals of the comparators and by those furnished by the blocking device and producing pulses throughout the period of conduction of the thyristor corresponding to each one thereof, two pulse amplifiers whose inputs are fed by the signals from the gates and whose outputs